UNITED STATES PATENT OFFICE.

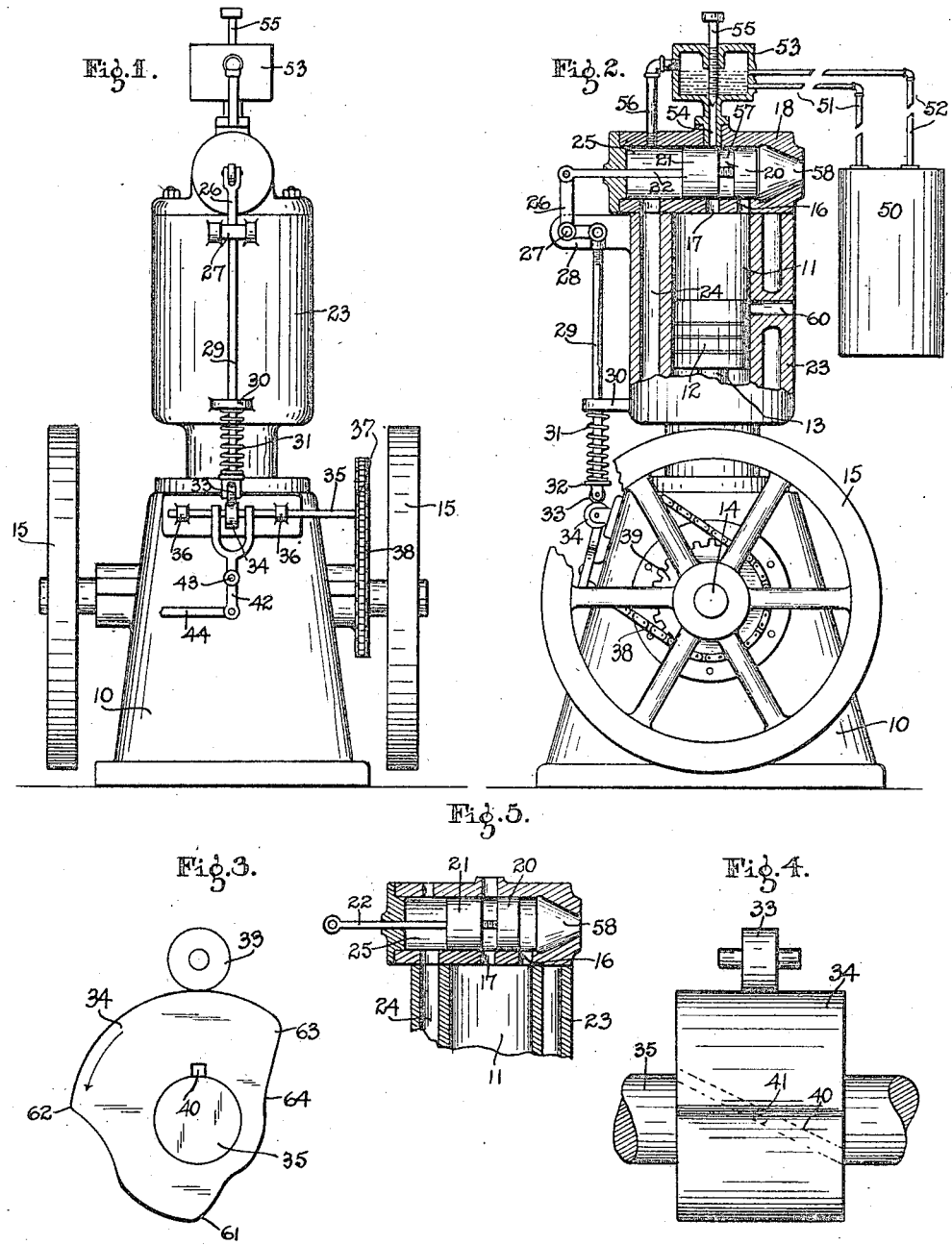

BENJAMIN P. REMY, OMAR H. DAY, AND FRANK I. REMY, OF ANDERSON, INDIANA, ASSIGNORS TO REMY BROTHERS COMPANY, OF ANDERSON, INDIANA, A COPARTNERSHIP.

ADJUSTABLE VALVE-GEARING FOR INTERNAL-COMBUSTION ENGINES.

1,260,052.

Specification of Letters Patent.

Patented Mar. 19, 1918.

Application filed January 19, 1914. Serial No. 813,011.

*To all whom it may concern:*

Be it known that we, BENJAMIN P. REMY, OMAR H. DAY, and FRANK I. REMY, citizens of the United States, and residents of Anderson, county of Madison, and State of Indiana, have invented a certain new and useful Adjustable Valve-Gearing for Internal-Combustion Engines; and we do hereby declare that the following is a full, clear, and exact description thereof, reference being had to the accompanying drawings, in which like letters refer to like parts.

The chief object of this invention is to improve the scavenging of the cylinder of an internal combustion engine at variable loads, that is, to enable a cylinder of the two-cycle engine to scavenge somewhat like a four cycle engine. Two cycle engines do not scavenge well under light loads and the effect of this invention is to improve the scavenging of two cycle engines under light loads.

The object is accomplished by a construction which enables the operation of the valves to be varied with relation to the crank shaft of the engine which causes the actuation of said valves and thus causes a retarded movement of the valve mechanism which will enable the piston on its outward stroke to scavenge the cylinder in the manner mentioned above and the lighter the load the greater the scavenging action.

Another object of this invention is to improve the operation of internal combustion engines by a novel arrangement of the valves for controlling the exhaust and fuel ports and for the admission of air under compression and for the regulation thereof so as to vary the supply of gas to the cylinder and its compression and, therefore, the amount of power delivered by the engine.

The chief features of the invention consist in providing a pair of valves adjustably connected so as to operate together, one for controlling the exhaust port and the other the fuel port, and regulating the operation of said valves by a governor controlled means driven by the crank shaft of the engine. Along with the foregoing is the utilization of the fuel supply valve for controlling the compression and admission of air into the cylinder.

The full nature of the invention will be understood from the accompanying drawings and the following description and claims.

In the drawings, Figure 1 is a side elevation of an internal combustion engine embodying this invention. Fig. 2 is an end elevation thereof with parts broken away and parts in vertical section. Fig. 3 is a side elevation of the cam and the roller riding thereon, on an enlarged scale. Fig. 4 is a front elevation of the same with the shaft partially broken away. Fig. 5 is a central longitudinal section through the valve mechanism and showing the valve ports in a different position from that in Fig. 2.

The internal combustion engine has a crank case 10 with a cylinder 11 having in it a piston 12 connected by a piston rod 13 with the crank shaft 14 which carries the fly wheels 15.

The combustion end of the cylinder is provided with an exhaust port 16 and a fuel inlet port 17. These ports are in the wall of a cylinder head or valve case 18 which contains two piston-like valves 20 and 21 which are mounted on some means like the piston-like rod 22 operating in said valve case and threaded to receive the valves 20 and 21 and enable them to be adjusted relative to each other and the ports of the valve case. The valve 21 is hollow. There is a water jacket 23 and a passageway 24 leading from a chamber 25 of the valve casing down to the crank chamber.

The valves 20 and 21 are operated and controlled through the rod 22 by a bell crank 26 mounted at 27 on a projection 28 from the cylinder and the shorter arm of said bell crank is pivotally connected with a vertical rod 29 operating through an arm 30 extending from the lower part of the cylinder, and said rod 29 is pressed downward and returned after actuation by a spiral spring 31 surrounding said rod and at the upper end, said spring bears against the fixed arm 30 and at its lower end against a collar 32 on the rod 29. The lower end of the rod 29 carries a roller 33 which bears against or rides upon a cam 34 adjustably mounted on a shaft 35 which is mounted in bearings 36 on the outside of the crank case and is driven by a sprocket wheel 37 on the shaft 35 and sprocket chain 38 leading from the sprocket wheel 39 on the crank shaft 14.

The cam 34 has a spirally disposed groove 40 in its internal bore, as shown in Figs. 3 and 4, into which a pin 41 from the shaft 35 loosely projects. The cam 34 is adjusted on the shaft 35 by a lever 42 which is fulcrumed at 43 to the crank case and has a yoke on its upper end engaging the shaft 35 and its lower end is actuated by a bar 44 which is controlled by a governor, not shown, intended to be operated by the engine and according to its speed.

A fuel tank 50 supplies fuel by pipe 51 to a bowl 53 mounted on the valve casing 18 and in communication with the valve casing by a port 54. 52 is a gasolene overflow pipe. A needle valve 55 controls the port 54. An air pipe 56 leads from the upper part of the bowl 53 to the chamber 25 in the valve casing. In said valve casing there is always a chamber 57 between the valves 20 and 21 and there is an exhaust chamber 58 in the end of the valve casing which communicates with the open air.

The operation of this mechanism is as follows:

As the piston moves from its innermost position toward its outer position, it creates a partial vacuum in the crank case and as it reaches its outermost position, it uncovers a port 60 in the side of the cylinder and then gives a free passageway from the crank case through said port 60 to the atmosphere, thus filling the crank case with air at atmospheric pressure.

As the piston moves from its outermost position inward, it compresses this air in the crank case and passage 24, as they are always in communication with each other. While the piston is traveling inward, the ports 16 and 17 are closed by the valves 20 and 21, respectively. At the same time, the crank shaft is causing the cam shaft 35 to rotate the cam in the direction shown by the arrow in Fig. 3. When the roller 33 comes in contact with the cam at the point 61, during the operation of the cam, it actuates the rod 29 and moves valves 20 and 21 to the left from the positions shown in Fig. 2, where they close all ports 16, 17 and 54, to the position shown in Fig. 5, so that the valve 20 uncovers the port 16, while the valve 21 uncovers the ports 17 and 54 for admitting oil.

After the cam 34 has moved so that the point 62 thereon engages the roller 33, the rod 29 is still further actuated upwardly or outwardly and the valves 20 and 21 move still farther to the left. At this time the air is being compressed in the crank case and the passage 24 and also on top of the fuel in the bowl 53.

As the port 54 is uncovered by the valve 21, the compressed air forces the charge of fuel from the bowl 53 past the needle valve 55 and through the port 54 where it is picked up by the compressed air flowing through the passage 24 through the valve 21, which is hollow, and thence, through port 17 into the cylinder. As this is being accomplished, the cam 34 has traveled so that the point 63 thereon engages the roller 33 and thereafter the roller 33 and rod 29 suddenly drop to the depression 64 in the cam, as the cam further rotates, whereupon the spring 31 forces the valves 20 and 21 to the right into the position shown in Fig. 2, where they close both ports 16 and 17 almost simultaneously. The piston then compresses the mixture of fuel which has entered the cylinder and it is fired in the usual way as in most internal combustion engines. After the explosion, the gas expands until the exhaust port 16 is opened, when the cycle of operation, just described, is repeated and the exhaust gases escape.

The governor driven by the engine, and not here shown, acts on the yielding lever 42, as heretofore explained, and slides the cam 34 axially along shaft 25, and this movement of the cam, on account of the spiral groove 40, will change the angular position of the cam on the shaft 35, and hence the relative positions of the valves 20 and 21 and the movement thereof relative to the position and movement of the piston will be varied, and the time of opening and closing the ports 16 and 17 relative to the movement of the piston will also be varied. In this way the exhaust port 16 may be arranged at a later point in the cycle which will give a more complete expansion to the burnt gases in the cylinder. This will also delay the opening of the port 17 to a corresponding extent, which, in turn, will allow the piston to go past its innermost position and start outward and that, in turn, will lower the compression in the crank case and passage. Hence, when the port 17 is uncovered by the valve 21, there will be less pressure on top of the fuel in the bowl 53 and a less amount of fuel forced into the cylinder. Since the exhaust port 16 remains open until the piston has covered parts of its outward stroke, there will be a less amount of air in the cylinder and hence, the compression of the fuel and air mixture in the cylinder will be lower at the time of ignition. As in the ordinary internal combustion engine, this will result in a lower explosion pressure, and a less amount of power will be delivered to the crank shaft.

If it be desired to increase the amount of power delivered, the governor acts on the cam 33 in the manner previously described, sliding it in the opposite direction along shaft 35, and this will change the operation of the valves to the reverse of what has just been described. Thus the exhaust port 16 will be opened earlier in the cycle as well as the port 17, and the compression in the crank case and passage 24 will be higher than previously, at the time the port 17 is opened. Therefore, more fuel will be injected into the cylinder and as the valves close earlier in the cycle, there will be a greater amount of air trapped in the cylinder, which, in turn, gives a higher compression pressure and a correspondingly higher explosion pressure.

The invention claimed is:

1. An internal combustion engine having a crank shaft, a cylinder with fuel and exhaust ports, a valve mechanism with rigidly connected valves for controlling said ports, and a connection between said valve construction and crank shaft arranged so as to be variable in the timing thereof, for the purpose set forth.

2. An internal combustion engine having a crank shaft, a cylinder with fuel and exhaust ports, a valve mechanism with valves adjustably but rigidly associated for controlling said ports, and means for actuating the valve mechanism from the crank shaft arranged so that the timing of the valves may be varied.

3. In an internal combustion engine having a crank shaft and cylinder with fuel and exhaust ports, a pair of slide valves for controlling said ports united together, a rod on which said valves are adjustably mounted, and means controlled by the crank shaft for actuating said rod.

4. In an internal combustion engine having a crank shaft and cylinder, a valve casing adjacent the cylinder with fuel and exhaust ports connecting said cylinder and casing and a fuel supply port to said casing, a pair of relatively adjustable slide valves for controlling said ports united together, and means controlled by the crank shaft for actuating said valves.

5. In an internal combustion engine having a crank shaft and cylinder with fuel and exhaust ports, a pair of slide valves for controlling said ports united together, a shaft driven by the crank shaft, a cam angularly adjustable on said shaft, and means actuated by said cam for operating said valves.

6. In an internal combustion engine having a crank shaft and cylinder with fuel and exhaust ports, a pair of valves for controlling said ports united together, an angularly adjustable cam driven by the crank shaft, means connected therewith to operate said valves, and means for angularly adjusting said cam.

In witness whereof, we have hereunto affixed our signatures in the presence of the witnesses herein named.

BENJAMIN P. REMY.
OMAR H. DAY.
FRANK I. REMY.

Witnesses:
RUTH I. MILLER,
ARTHUR BERGER.

Copies of this patent may be obtained for five cents each, by addressing the "Commissioner of Patents, Washington, D. C."